United States Patent
Plumer

(10) Patent No.: US 6,254,195 B1
(45) Date of Patent: Jul. 3, 2001

(54) VEHICLE WHEEL SIMULATOR ATTACHING APPARATUS

(76) Inventor: Mark J. Plumer, 680 Amalfi Dr., Pacific Palisades, CA (US) 90272

( * ) Notice: Subject to any disclaimer, the term of this patent is extended or adjusted under 35 U.S.C. 154(b) by 0 days.

(21) Appl. No.: 09/374,012

(22) Filed: Aug. 16, 1999

(51) Int. Cl.[7] .................................................... B60B 7/14
(52) U.S. Cl. ................................................... 301/37.37
(58) Field of Search ............................... 301/37.1, 37.37, 301/108.1, 108.4

(56) References Cited

U.S. PATENT DOCUMENTS

| | | | |
|---|---|---|---|
| 3,549,204 | * | 12/1970 | Spisak ................................ 301/37.37 |
| 4,787,681 | * | 11/1988 | Wang et al. ...................... 301/37.37 |
| 4,881,783 | * | 11/1989 | Campbell .......................... 301/37.37 |
| 4,998,780 | * | 3/1991 | Eshler et al. ..................... 301/37.37 |
| 5,031,965 | * | 7/1991 | Buerger ............................. 301/37.37 |
| 5,193,884 | * | 3/1993 | Shell et al. ........................ 301/37.37 |
| 5,205,616 | * | 4/1993 | Wright ............................... 301/37.37 |
| 5,286,093 | * | 2/1994 | Wright ............................... 301/37.37 |
| 5,503,465 | * | 4/1996 | Price et al. ........................ 301/37.37 |

* cited by examiner

*Primary Examiner*—Russell D. Stormer
(74) *Attorney, Agent, or Firm*—Albert O. Cota

(57) ABSTRACT

A wheel simulator attaching apparatus (10) for a vehicle and more particularly to a truck wheel (20) that is fastened to the truck wheel with studs (22) and lug nuts (24). A decorative wheel simulator (26) is mounted over the truck wheel with bores (28) that are aligned with the studs and its outer periphery touches the wheel rim. Retaining extensions (30) align with the bores, and are threaded onto the studs. A hex nut (42) or lock ring (44) is attached to the retaining extension that includes external threads, in the preferred embodiment, and holds the simulator against the wheel rim in an adjustable manner. A second embodiment utilizes an integral head (48) on the extension and one or more flat washers (50) height for adjustment.

12 Claims, 3 Drawing Sheets

VEHICLE WHEEL SIMULATOR ATTACHING APPARATUS

TECHNICAL FIELD

The invention pertains to the general field of motor vehicle wheel simulators and more particularly to a decorative wheel simulator that is attached to the wheel using the vehicle's wheel studs without affecting the original lug nuts.

BACKGROUND ART

Previously wheel simulators or wheel covers have been attached to vehicle wheels by the use of the original lug nuts or sometimes stud extenders that utilize enlarged threads or even ramped lug nuts with expandable washers. This method provides an effective means for quick removal and attachment of a wheel cover using the existing lug stud.

A search of the prior art did not disclose any patent that read directly on the claims of the instant invention, however, the following U.S. patents are considered related:

| U.S. PAT. NO. | INVENTOR | ISSUED |
| --- | --- | --- |
| 5,205,616 | Wright | 27 April 1993 |
| 5,205,614 | Wright | 27 April 1993 |
| 4,946,228 | HSU, et al | 7 August 1990 |
| 4,606,582 | Warren | 19 August 1986 |
| 4,240,670 | Zorn, et al | 23 December 1980 |

Wright in U.S. Pat. Nos. 5,205,616 and 5,205,614 teaches a stud extender that attaches over both a vehicle lug nut and stud. The extender provides a base or mounting shoulder for the wheel cover and a larger diameter stud that permits the stud to be lengthened sufficiently to retain the wheel cover using a conventional jamb nut.

Pat. No. 4,946,228 issued to Hsu and the instant applicant, presents an annular mounting plate that is disposed on a vehicle axle such that its openings respectively align with the corresponding bore of a wheel cover. The plate contains locking apertures and screws that lock the plate to the wheel cover allowing easy assembly or disassembly of the hub cover.

Pat. No. 4,606,582 issued to Warren is for a decorative wheel cover for use on trucks that is supported only at its center portion with a contour that closely matches the vehicle wheel. A plate covering protects the truck wheel assembly mounting plate and hub, and completes the wheel covering.

Zorn, et al in Pat. No. 4,240,670 discloses a vehicle wheel covering with a majority of openings oversized to slip over lug nuts. The remaining openings require replacement of the lug nut with an expandable washer between a chamfered end of the lug nut and a mounting flange of the wheel cover.

As evident that the prior art was not concerned with simply using the extending portion of the stud beyond the lug nut but, instead they utilize a base or mounting surface on replacement nuts, to mount the vehicle wheel covering.

DISCLOSURE OF THE INVENTION

Wheels on motor vehicles are an important part of the aesthetics which affect the vehicles overall appearance. It should be appreciated that wheel covers add considerably to the decor of automobiles and trucks.

The United States Department of Transportation (DOT) requires that the wheel of a truck must be examined, therefore the operator must be able to remove the simulator easily. Also, some original equipment manufacturers require that wheel trim attachments must not be mounted underneath the lug nuts.

As it has been noted in the prior art, the industry normally mounts the simulator directly on top of the lug nut then utilizes a jamb nut on the stud to captivate the simulator inbetween. If insufficient external projection of the stud exists, a stud extender, having a flanged base with internal and external threads, is used to lengthen usable region of the stud. Either procedure is not always an ideal paragon since variations in the combination of the wheel, configuration of the simulator and the height of the lug nut may cause a tolerance buildup. This variation is apparent when the simulator is clamped contiguously against the top of the lug nut such that the periphery of the simulator may not be tightly interfaced against the entire rim causing the simulator to rattle or make a clicking sound. If the tolerance buildup is negative, the simulator is forced against the wheel to the extent that it may be actually deformed in the area adjacent to the lug nut, if the deformation caused by this anomaly is excessive it may create an off center condition where the wheel may appear to wobble during rotation, a circumstance referred to in the industry as a "Hawaiian Wiggle".

In light of the above, it is therefore a primary object of the invention to provide controllable adjustment thus permitting the simulator to always be clamped firmly and evenly against the entire rim of the wheel eliminating any noise emission in the form of clicking or rattling and any possibility of wobble. When the simulator is installed using the invention this problem of tolerance buildup is completely eliminated since the device is adjusted until the attaching nut is tightened only until a firm clicking sound is heard and the circumferential engagement is assured.

These and other objects and advantages of the present invention will become apparent from the subsequent detailed description of the preferred and second embodiments and the appended claims, further, taken in conjunction with the accompanying drawings.

BEST MODE FOR CARRYING OUT THE INVENTION

The best mode for carrying out the invention is presented in terms of a preferred and second embodiment for a motor vehicle wheel simulator attaching apparatus 10. Both embodiments are primarily designed alike with the exception of the configuration of the stud retaining extensions and the compression members.

Figure 1:
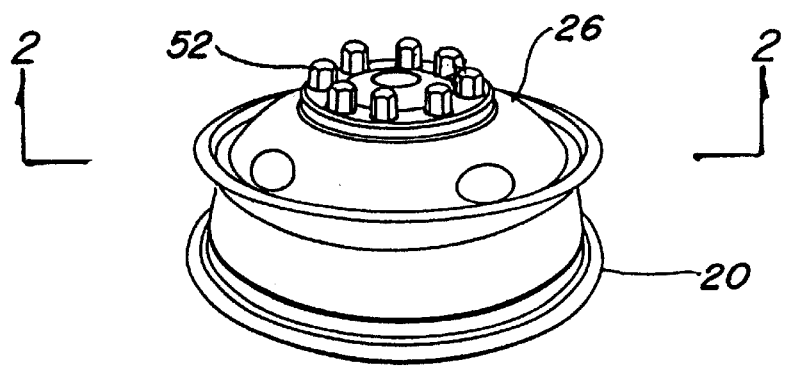
FIG. 1 is a partial isometric view of the preferred embodiment including a simulator mounted onto a truck wheel.
Figure 2:
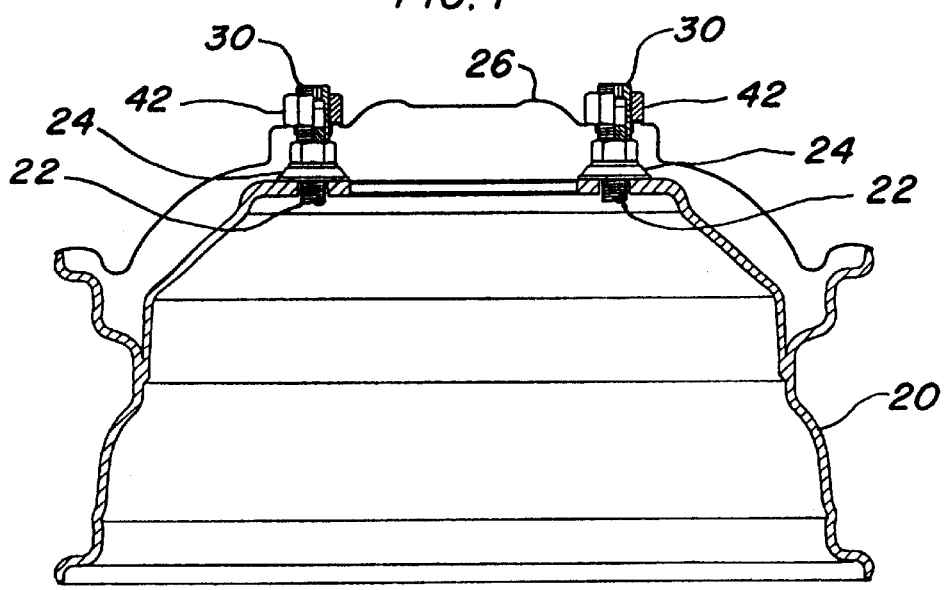
FIG. 2 is a cross sectional view taken along lines 2—2 of FIG. 1 with acorn covers removed.
Figure 3:
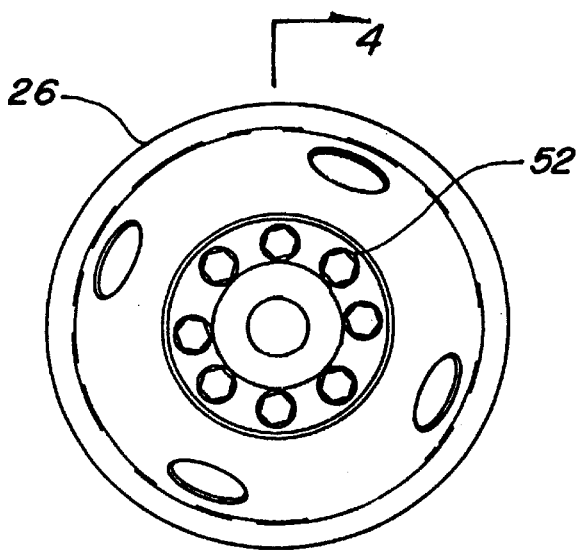
FIG. 3 is a front view of the preferred embodiment attached to the wheel with the acorn covers in place.
Figure 4:
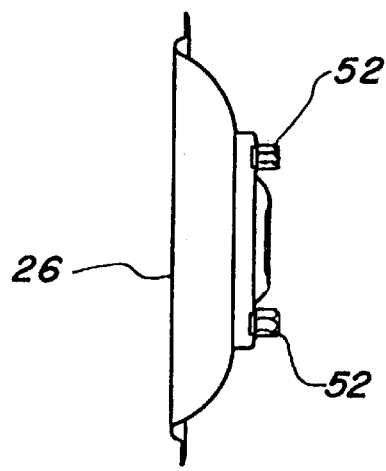
FIG. 4 is a cross sectional view taken along lines 4—4 of FIG. 3.

The preferred embodiment for the apparatus 10, as shown in FIGS. 1 through 6, 9, and 10, is designed to be attached to a motor vehicle wheel, more particularly to a truck wheel 20. The vehicle's mounting studs 22 that protrude from the brake hub along with the original equipment manufacturers lug nuts 24 are employed to mount the wheel simulator in place. A wheel simulator 26 covers the wheel entirely along the outside surface including all of the exposed components described above. The apparatus 10 includes a decorative wheel simulator 26 having a number of bores 28 that are positioned on a bolt circle, as shown in FIGS. 1–4. The wheel simulator 26 is configured to cover the vehicle wheel 20 and engage its outward periphery, as illustrated in FIGS. 1 and 2. The bores 28 are positioned in direct alignment with the studs 22 and lug nuts 24. The simulator 26, which is plastic or metal, is designed to interface with a specific set of truck wheels 20 and, is plated or treated in such a manner as to add to the aesthetics of the vehicle's wheels.

Figure 5:
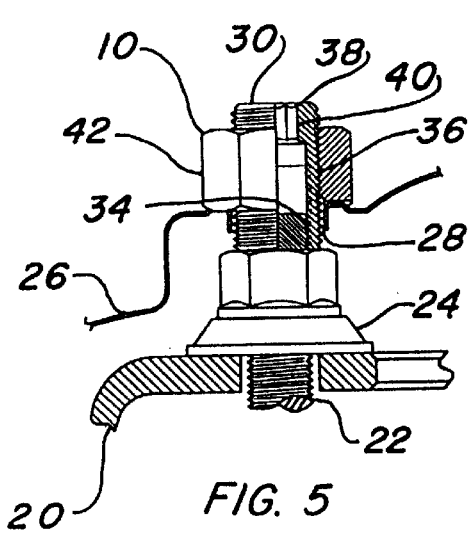
FIG. 5 is a partial cross sectional view of the preferred embodiment with a hexagonal hut in place on the stud retaining extension.

A specific number of apparatus 10 contiguously engage the wheel simulator 26 around the bores 28 and are in attached to the studs 22 above the lug nuts 24. The preferred embodiment is illustrated in FIGS. 1–6 and consist of a a plurality of stud retaining extensions 30 each having a cylindrical shank 32 and internal threads 34 that mate with the vehicle studs 22. FIG. 5 illustrates this embodiment best which includes external threads 36 along the entire longitudinal surface of the shank as shown. The extensions 30 also incorporate means to install the extension on the wheel studs 22 in the form of an enclosed top 38 having a polygonal shaped opening 40 in the center. This top is configured to accept a tool to rotate the extension for installation. The opening 40 is preferably hexagonal in shape permitting a hex wrench to be employed which is in common usage and readily available. The extension 30 may then be affixed to the stud 22 above the lug nut 24 and be tightened securely in place. When all of the extensions 30 are positioned and tightened the simulator 26 may be installed over the extensions 30, which are in alignment with the original studs 22, until the periphery of the simulator 26 touches the rim of the wheel 20.

Figure 6:
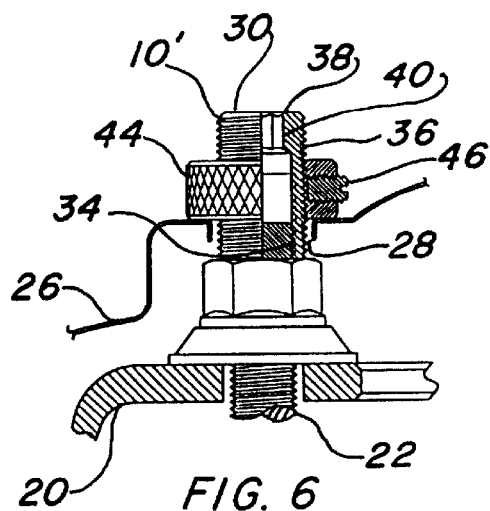
FIG. 6 is a partial cross sectional view of the preferred embodiment with a lock ring in place on the stud retaining extension.

In order to hold the simulator 26 in place over the extensions 30 the appropriate number of compression members, in the form of hex nuts 42, are sequentially torqued until the simulator is held evenly in place and in the correct relative position onto the rim of the wheel 20 as shown in FIG. 2. An alternate configuration of this compression member is illustrated in FIG. 6 and instead of the hex nut, still using the same stud retaining extension 30 a lock ring 44 is utilized having a set screw 46, shown independently in FIG. 10'. This lock ring 44 and set screw 46 are well known and readily available to those practicing the art.

Figure 7:
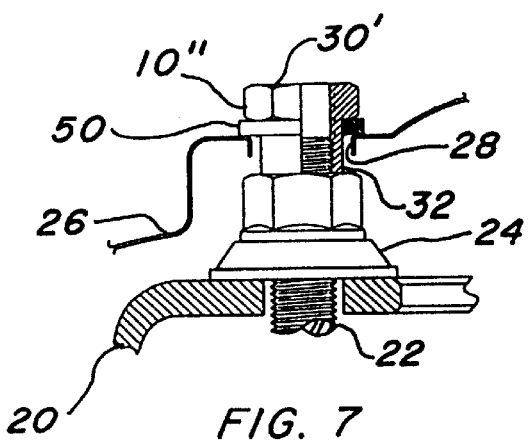
FIG. 7 is a partial cross sectional view of the second embodiment with a flat washer in place on the stud retaining extension.
Figure 8:
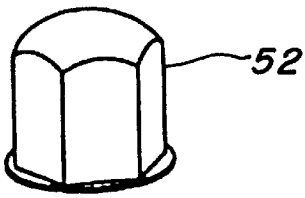
FIG. 8 is a partial isometric view of the acorn cover completely removed from the invention for clarity.
Figure 9:
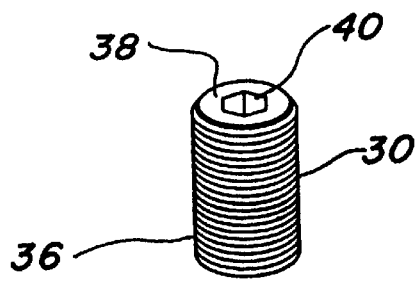
FIG. 9 is a partial isometric view of the preferred embodiment of the stud retaining extension including the external threads, the extension removed from the invention for clarity.
Figure 11:
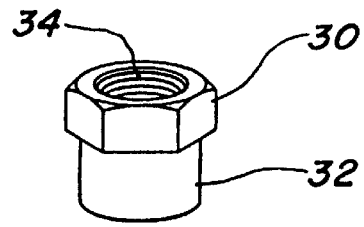
FIG. 11 is a partial isometric view of the second embodiment of the stud retaining extension including the hexagonal head and smooth shank, the extension removed from the invention for clarity.
Figure 10:
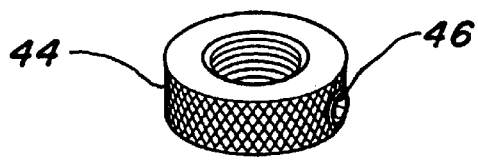
FIG. 10 is a partial isometric view of the lock ring completely removed from the invention for clarity.
Figure 12:
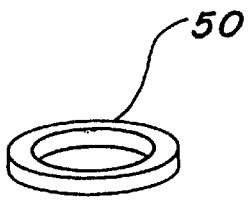
FIG. 12 is a partial isometric view of the flat washer completely removed from the invention for clarity.
Figure 13:
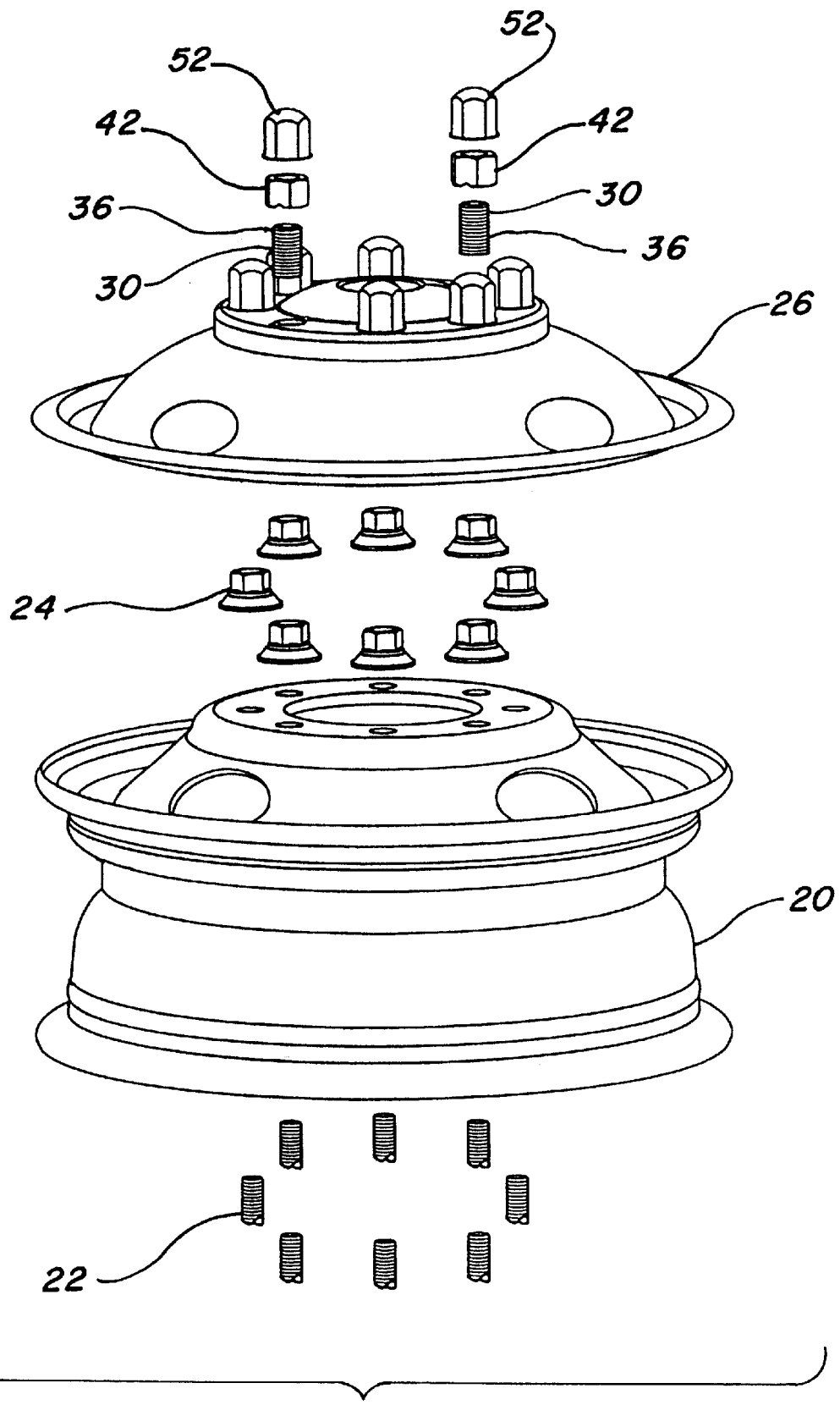
FIG. 13 is a partial isometric exploded view of the preferred embodiment.

FIGS. 7, 11 and 12 depict the second embodiment of the apparatus 10" of the invention wherein the compression members are in the form of stud retaining extensions 30' having the cylindrical shank 32 smooth and unobstructed and further include an integral hexagonal head 48 on an outward end. A flat washer 50 is placed inbetween the simulator 26 and the head 48 of the extension 30 and acts as a permanent adjustment by originally selecting the proper thickness. It has been found that from 0.042 inch (1.08 millimeter) to 0.188 inch (74 millimeter) is deal for the purpose. It should also be realized that any number of thickness may be used interchangeably or in combination to accomplish the task. It will be plainly seen that either embodiment will accomplish the proper alignment and overcome the problem that has plagued the industry for quite some time.

To improve the aesthetic appearance of the wheel simulator after the attaching apparatus has been employed the compression members 30 may be covered with acorn covers 52 having the same finish as the simulator. These acorn covers are sized to grip the compression members 30 by tension and are well known and in common usage.

Installation of the simulator 26 has been previously discussed with disassembly procedures inherently simple and easy for one skilled in the art to understand.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A motor vehicle wheel simulator attaching apparatus for a vehicle wheel that is fastened to the vehicle by a plurality of studs and lug nuts comprising:
   a) a decorative wheel simulator having a plurality of bores positioned on a bolt circle, configured to cover a vehicle wheel and exclusively engage its outward periphery, wherein said bores directly align with vehicle studs and lug nuts without touching,
   b) a plurality of stud retaining extensions each having a cylindrical shank, an external longitudinal surface and internal threads, and extension internal threads mating with the vehicle studs and disposed within the wheel simulator bores, said stud retaining extensions include external threads along said external longitudinal surface and means to install the extension upon the wheel studs, said stud retaining extensions comprise an enclosed top having a polygonal shaped opening therein such that an oppositely configured tool may be inserted and rotate the extension on the stud until it tightly engages the wheel lug nut, and
   c) a plurality of simulator compression members retained by the shank of the stud retaining extensions maintaining compression between the wheel simulator and the wheel rim such that alignment may be maintained solely on the wheel's outward periphery by the relative position of the extensions and compression members.

2. The motor vehicle wheel, simulator attaching apparatus as recited in claim 1 wherein said simulator compression members further comprise a hexagonal nut.

3. The motor vehicle wheel simulator attaching apparatus as recited in claim 1 wherein said simulator compression members further comprise a lock ring.

4. The motor vehicle wheel simulator attaching apparatus as recited in claim 3 wherein said simulator compression member lock ring further having a set screw threadably disposed therein.

5. The motor vehicle wheel simulator attaching apparatus as recited in claim 1 further comprising a plurality of acorn covers grippingly disposed upon said simulator compression members for concealment thereof.

6. A motor vehicle wheel simulator attaching apparatus for a vehicle wheel that is fastened to the vehicle by a plurality of studs and lug nuts comprising:

a) a decorative wheel simulator having a plurality of bores positioned on a bolt circle, configured to cover a vehicle wheel and exclusively engage its outward periphery, wherein said bores directly align with vehicle studs and lug nuts without touching, b) a plurality of stud retaining extensions each having a cylindrical shank and internal threads, said extension internal threads mating with the vehicle studs and disposed within the wheel simulator bores, said stud retaining extensions having an integral hexagonal head on said stud retaining extensions outward end and said cylindrical shank is smooth and unobstructed, and c) a plurality of simulator compression members retained by the shank of the stud retaining extensions maintaining compression between the wheel simulator and the wheel rim such that alignment may be maintained solely on the wheel's outward periphery by the relative position of the extensions and compression members.

7. The motor vehicle wheel simulator attaching apparatus as recited in claim 6 wherein said simulator compression members further comprise a flat washer having an interior diameter to slideably fit over the cylindrical shank with the hexagonal head providing a shoulder for interfacing with the washer.

8. The motor vehicle wheel simulator attaching apparatus as recited in claim 7 wherein said flat washer has a thickness between 0.042 inch (1.08 millimeter) to 0.188 inch (74 millimeter).

9. A motor vehicle wheel simulator attaching apparatus for attaching a wheel simulator to a vehicle wheel that is fastened to the vehicle by a plurality of studs and lug nuts with the wheel simulator having a plurality of bores and configured to attach to the vehicle wheel exclusively on the vehicle wheel's outward periphery comprising:

a) a plurality of stud retaining extensions each having a cylindrical shank and internal threads, said extension internal threads mating with the vehicle studs and disposed within the wheel simulator bores without touching, said stud retaining extensions having an integral hexagonal head on an outward end and said cylindrical shank is smooth and unobstructed, and b) a plurality of simulator compression members retained by the shank of the stud retaining extensions maintaining compression between the wheel simulator and the wheel rim such that alignment may be maintained solely on the wheel's outward periphery by the relative position of the extensions and compression members.

10. The motor vehicle wheel simulator attaching apparatus as recited in claim 9 wherein said simulator compression members further comprise a flat washer having an internal diameter to slideably fit over the round shank with the hexagonal head providing a shoulder for interfacing with the washer.

11. The motor vehicle wheel simulator attaching apparatus as recited in claim 10 wherein said flat washer has a thickness between 0.042 inch (1.08 millimeter) to 0.188 inch (74 millimeter).

12. The motor vehicle wheel simulator attaching apparatus as recited in claim 9 further comprising a plurality of acorn covers grippingly disposed upon said simulator compression members of concealment thereof.

* * * * *